United States Patent [19]

Tome

[11] 3,841,464

[45] Oct. 15, 1974

[54] HYDRAULICALLY FOLDING MATERIAL DISCHARGE CONVEYOR

[75] Inventor: Larry D. Tome, Wauwatosa, Wis.

[73] Assignee: Lippmann, Inc., Milwaukee, Wis.

[22] Filed: Oct. 30, 1972

[21] Appl. No.: 302,346

[52] U.S. Cl. .............................................. 198/115
[51] Int. Cl. ............................................ B65g 21/12
[58] Field of Search ............ 198/113, 114, 115, 87; 214/520, 521, 522, 83.26, 147 R, 147 AS, 147 C; 212/144

[56] References Cited
UNITED STATES PATENTS

| | | | |
|---|---|---|---|
| 2,374,903 | 5/1945 | Spiegl | 198/233 |
| 2,521,861 | 9/1950 | Mathias | 212/144 |
| 2,761,578 | 9/1956 | Brownlee | 214/522 |
| 3,085,675 | 4/1963 | Feiteira | 198/113 |
| 3,501,035 | 3/1970 | Whiting | 214/147 AS |

Primary Examiner—Richard E. Aegerter

[57] ABSTRACT

A hydraulically foldable discharge conveyor for a portable bulk material processing plant, the conveyor being formed from three pivotally interconnected conveyor sections and two pair of hydraulic assemblies connected to fold and unfold the conveyor. A cross braced frame is mounted on the third or upper conveyor section and is connected to one of the pair of hydraulic assemblies to cushion vibrations of the conveyor.

7 Claims, 4 Drawing Figures

HYDRAULICALLY FOLDING MATERIAL DISCHARGE CONVEYOR

BACKGROUND OF THE INVENTION

The use of portable bulk material processing plants is well known in the material processing art and is frequently employed for processing gravel and producing aggregate or crushed materials of substantially uniform size that is especially suited for use in road construction projects. Apparatus of this nature comprises a number of components for subjecting the material to be processed to a plurality of crushing, screening, and sorting operations. These components are generally positioned on a trailer frame together with conveyors so that a continuous process may be performed. Certain types of these portable plants are considered "oversized" in that their length and height are in excess of certain specified units. For example, one type of dual crushing plant is in excess of 75 feet long and the owner of this type of portable plant cannot legally travel over certain roads in certain states. Furthermore, the owner will frequently find himself obliged to acquire special permits to travel due to excessive length of the plant and also may be limited to certain roads due to bridges and other obstacle clearances. All this can greatly handicap the operation of oversized plants and can sharply reduce profits earned by this type of machine.

One prior solution to these problems has been simply to restrict the design of portable plants to smaller sizes which meet these requirements. However, these smaller plants do not have the crushing, screening and sorting capacity as the oversize plant. Thus there are distinct advantages to oversized plants and the problem remains of how to design oversized vehicles so they can avoid many of the size regulations and restrictions which impair their use.

Another prior solution to these problems has been to use foldable type conveyors that could be collapsed for road travel. However, considerable time was required to disconnect the various braces used to support the conveyor in order to fold this type of conveyor. The conveyor was also subject to damage because of the use of cranes or fork lift trucks to support the conveyor while the braces were being removed.

SUMMARY OF THE INVENTION

The preceding described problems have been overcome by providing a hydraulically folding discharge conveyor which can be folded in such a way as to lower the overall height of the plant, shorten the overall length of the plant and provide tractor clearance which will permit fifth wheel towing from one work area to another. The conveyor is provided with two sets of hydraulic rams which are connected to the conveyor sections of the discharge conveyor to enable the conveyor to be folded. A novel cross braced frame and cable support arrangement prevents the conveyor from wracking or otherwise folding improperly. The use of hydraulic actuating assemblies makes it possible to raise or lower the conveyor in a few minutes and doesn't require any assembly or disassembly of parts.

DRAWINGS

DESCRIPTION OF THE INVENTION

Figure 1:
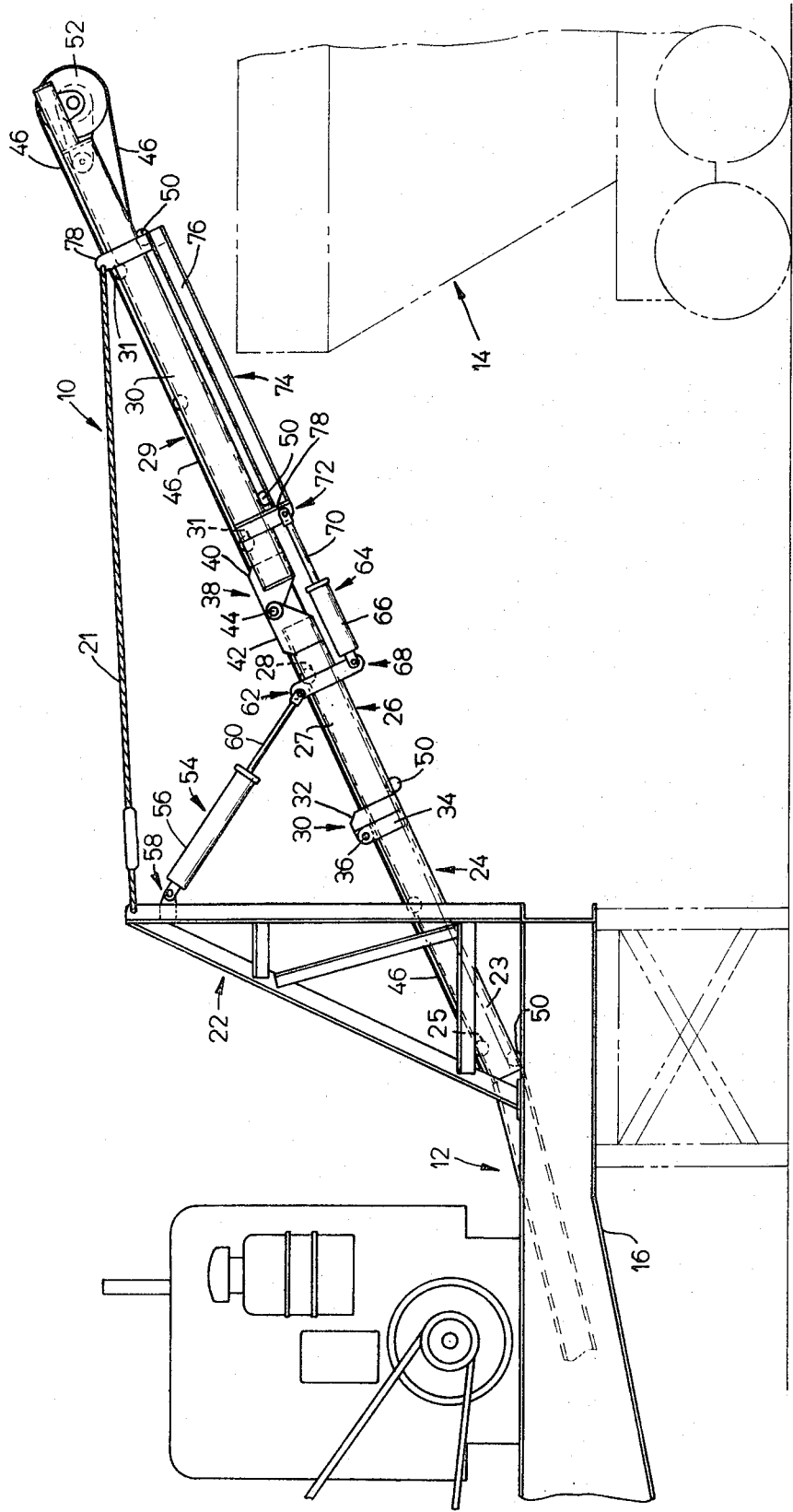
FIG. 1 is a side view of the discharge conveyor of this invention shown connected to the end of a portable processing plant.

The hydraulically foldable discharge conveyor 10 of the present invention is used to discharge materials from a bulk material processing plant 12. A processing plant of this type as seen in the Quinn U. S. Pat. No. 3,073,536 issued on Jan. 15, 1963 and entitled "Portable Crushing Plant" includes components for crushing, screening and sorting materials. The aggregate or crushed material is discharged by the conveyor 10 directly into a hopper or trailer 14. The components for the processing plant 12 are mounted on a chassis 16 which can be attached to the fifth wheel 18 of a truck 20 for road travel.

Foldable Conveyor

In accordance with the invention the conveyor 10 is connected to the supporting chassis 16 of the processing plant 12 and extends angularly upwardly when in use. The conveyor 10 is supported in the operative position by means of an A-frame 22 mounted on the chassis 16 and a pair of cables 21 connected between the A-frame 22 and the upper end of the conveyor 10.

The conveyor 10 includes a first conveyor section 24, a second or intermediate conveyor section 26 and a third or upper conveyor section 29. The first or fixed conveyor section 24 is formed from a pair of side channel members 23 interconnected by cross members 25. The side members 23 are rigidly secured to the chassis 16 and to the A-frame 22 and extends angularly upwardly from the chassis 16.

Figure 2:
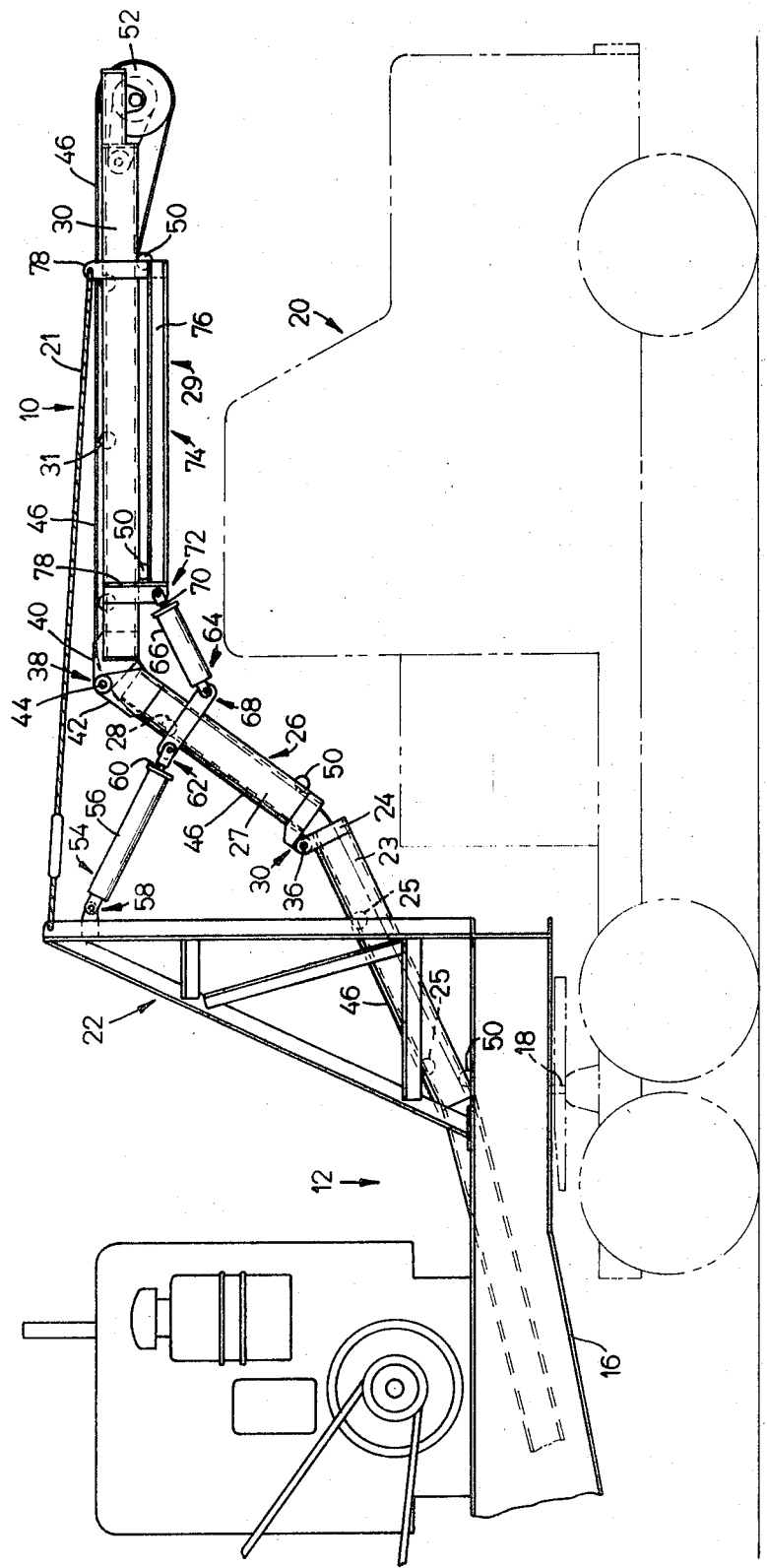
FIG. 2 is a view of the discharge conveyor shown in the collapsed or folded position.

The second conveyor section 26 is formed from a pair of side channel members 27 interconnected by cross braces 28. The side channel members 27 are pivotally connected to the side channel members 23 of the first conveyor section 24 by means of hinge assemblies 30. In this regard, each hinge assembly 30 includes an L-bracket 32 connected to the lower end of the side channel members 27 and a pivot bracket 34 connected to the upper end of the side channel member 23. The L-brackets 32 are connected to the pivot brackets 34 by pivot pins 36 to allow for counterclockwise pivotal movement of the second conveyor section 26 about the pivot pin 36 as seen in FIGS. 1 and 2. In the operative position of the second section 26 with respect to the first section, the bracket 32 will be seated against the pivot bracket 34 limiting the amount of travel of the second conveyor section 26.

The third conveyor section 29 includes side channel members 30 interconnected by cross braces 31. The channel members 30 are pivotally connected to the side channel members 27 by means of second hinge assemblies 38. Each hinge assembly 38 includes a pivot plate 40 connected to the lower end of the side channel members 30 and a pivot plate 42 connected to the upper end of the side channel members 27. The plates 40 are hingedly connected to the pivot plates 42 by pivot pins 44. In the operative position of the third conveyor section 29 with respect to the second conveyor section 26, the upper end of the third conveyor section 29 is supported by means of the cables 21.

Aggregate is conveyed from the processing plant and up the conveyor 10 by means of a conveyor belt 46 which is supported on the conveyor sections 24, 26 and 29. The belt is supported by trough idlers and return idlers 50 provided on the conveyor sections 24, 26 and 29. The belt 46 is a continuous belt and is wrapped around a head or end pulley 52 provided at the upper end of the third conveyor section 29.

Means are provided for hydraulically lifting or raising the second or intermediate section 26 with respect to the first section 24. Such means is in the form of a pair of hydraulic piston and cylinder assemblies 54 connected between the A-frame 22 and the second section 26. Each piston and cylinder assembly 54 includes a cylinder 56 pivotally connected to the A-frame 22 by means of a clevis assembly 58 and a piston rod 60 pivotally connected to the second conveyor section 26 by means of a clevis assembly 62. When the second conveyor section 26 is folded or retracted for road travel, the piston 60 is retracted into the cylinder 56 to raise the second conveyor section 26 to the position shown in FIG. 2. The cables 21 will become slack as the conveyor sections 26 and 29 pivot counterclockwise about the pivot pin 36.

After the second conveyor section 26 and third conveyor section 29 have been elevated for road travel, the third section 29 is allowed to pivot or drop clockwise about pivot pin 44 to a substantially horizontal or parallel position with respect to the road. This is accomplished by means of a second pair of hydraulic piston and cylinder assemblies 64 connected between the second conveyor section 26 and the third conveyor section 29. Each hydraulic piston and cylinder assembly 64 includes a cylinder 66 pivotally connected to the second conveyor section 26 by means of a clevis assembly 68, and the piston rod 70 is pivotally connected to the third section 29 by means of a clevis assembly 72. The third section 29 is allowed to pivot about the pivot pin 44 by relieving the pressure of the fluid within the cylinder 66 to allow the piston rod 70 to move into the cylinder 66 due to the weight of the third section 29.

Figure 3:
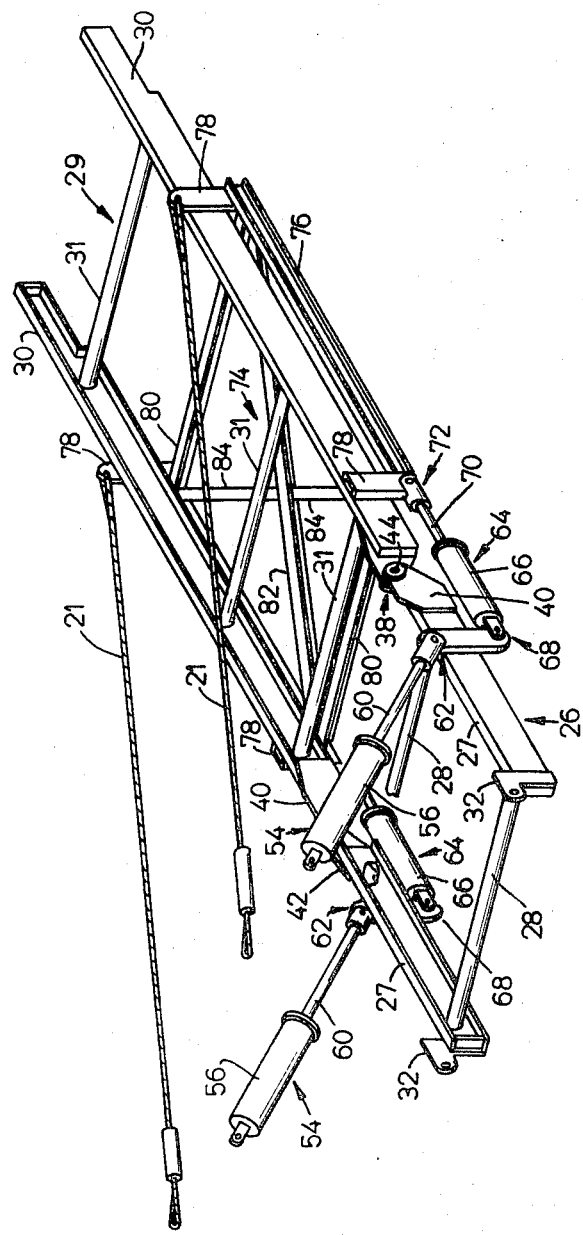
FIG. 3 is a perspective view of the second and third conveyor sections showing the cross braced frame and the hydraulic assemblies.

Means are provided for absorbing excessive vibrations or wracking of the third conveyor section 29 in the form of a cross braced frame 74. In this regard and referring to FIG. 3, the cross braced frame 74 is formed by a pair of side channel members 76 and a pair of cross braces 80 provided at the ends of the side channel members 76. Distortion of the frame 74 is prevented by means of diagonal braces 82 and 84. The diagonal brace 82 extends from one corner of the frame 74 to the opposite corner. The diagonal brace 84 is separated into two sections which are connected to opposite corners of the frame 74 and at their inner ends to the diagonal brace 82. The frame 74 is suspended beneath the third conveyor section 29 on plates 78 which are connected to the side channel members 30. It should be noted that the corners of the frame 74 at one end are also connected to the clevis assembly 72 for the piston rod 70 of the second hydraulic piston and cylinder assembly 64 to provide a hydraulic cushion for the cross braced frame 76. In the operative position of the third conveyor section 29, the hydraulic fluid within the cylinder 66 acts as a cushion to absorb vibrations of the third conveyor section 29.

In operation, the conveyor, as seen in FIG. 1, extends angularly upwardly from the chassis 16 of the processing plant 12 in a position to discharge material into the truck 14. When the processing plant 12 is to be moved, clearance is provided for the cab of the truck 20 by folding the conveyor to the position shown in FIG. 2. This is accomplished by initially raising the second conveyor section 26 by means of the piston and cylinder assembly 64 which also reduces the length of the conveyor 10. The conveyor section 29 is then dropped to the horizontal position by releasing the pressure of the fluid within the hydraulic piston and cylinder assembly 64. The outer end of the third conveyor section 29 is thereby reduced in height for road travel.

Hydraulic Circuit

Figure 4:
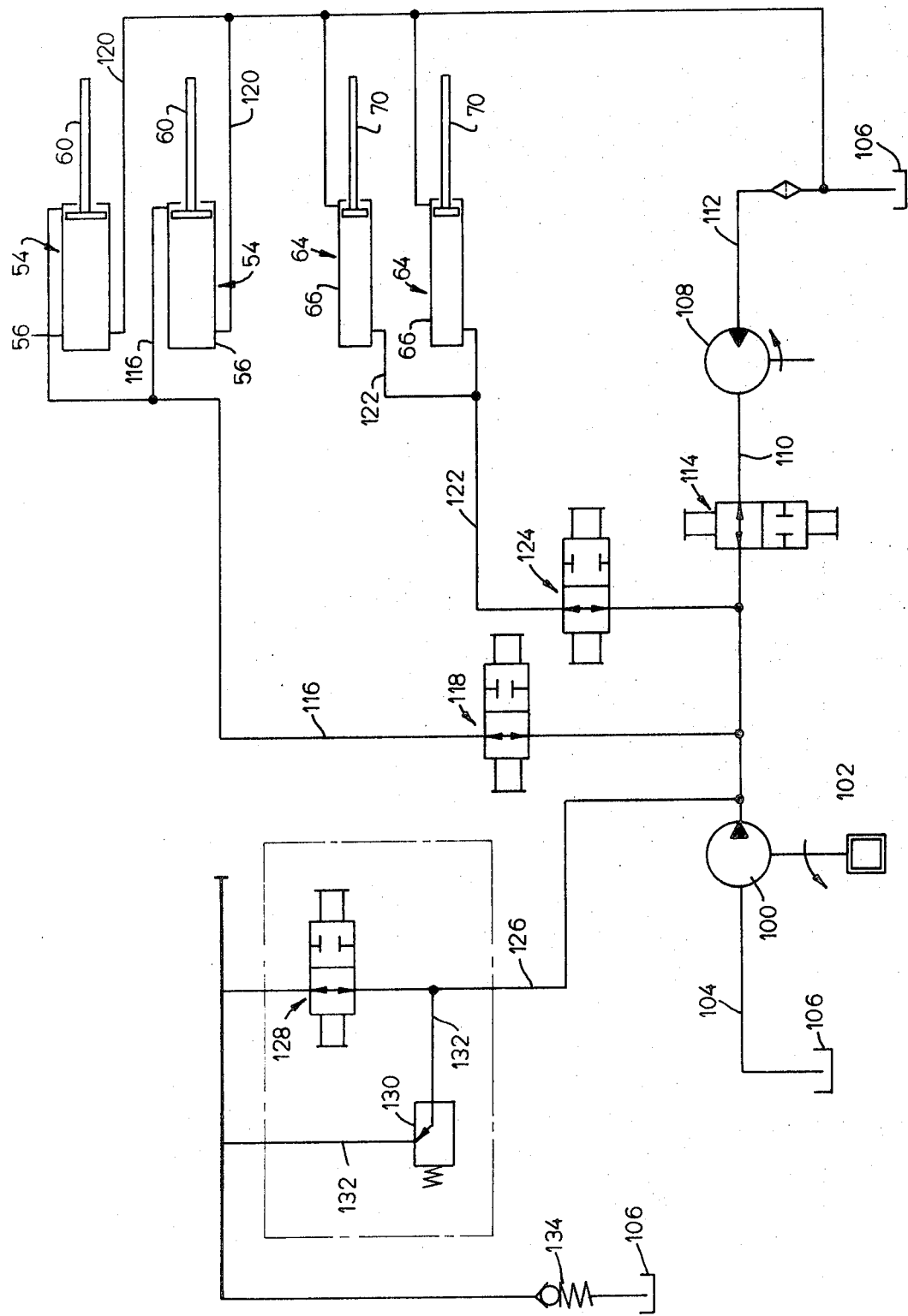
FIG. 4 is a schematic view of the hydraulic circuit for raising and lowering the discharge conveyor.

Referring to FIG. 4, a schematic diagram is shown of the hydraulic circuit means for selectively operating the hydraulic assemblies 54 and 64 for folding and unfolding the conveyor 10. Pressurized fluid is provided for operating the hydraulic assemblies 54 and 56 by a pump 100 driven by a power source 102, either electrical or mechanical, and connected by a line 104 to a reservoir 106. Fluid under pressure from the pump 100 is used to drive a hydraulic motor 108 connected to the pump 100 by a line 110 and to the reservoir 106 by a line 112. A normally open two way valve 114 is provided in line 110 to control fluid flow to the motor 108.

The first hydraulic assemblies 54 are pressurized to raise the second conveyor section 54 through a line 116 connected to line 110 and to the piston rod end of cylinder 56. Control of fluid flow through line 116 is controlled by means of a normally closed two way valve 118. Fluid from the other end of cylinders 56 is returned to reservoir 106 through lines 120.

The second hydraulic assemblies 64 are pressurized to raise the thrid conveyor section 29 through lines 122 connected to line 110 and to the cylinder end of cylinders 66. The flow of fluid is controlled by means of a normally closed two way valve 124. Fluid is returned from its piston rod end of cylinder 66 by fluid lines 126.

Fluid can be bypassed from line 110 directly to the reservoir 106 through a bypass line 126. The flow of fluid through bypass line 126 is controlled by means of a normally closed valve 128 provided in line 126. The maximum pressure of fluid in line 126 is controlled by means of a pressure responsive bypass valve 130 connected across valve 178 by line 132. Reverse flow of fluid in line 126 is prevented by a check valve 134.

In operation, valve 114 is normally open and valves 118, 124 and 128 are normally closed. The conveyor 10 is in the extended position and fluid under pressure is being used to drive motor 108. To fold the conveyor, valve 114 is closed to stop the motor and valve 118 opened to retract pistons 60 in assemblies 54. When the second conveyor 26 has been raised to the desired height, valve 118 is closed and valves 124 and 126 are opened. Fluid in cylinder 66 will be forced by pistons 70 through lines 122, 110 and 126 to the reservoir due to the weight of the third conveyor section 29. Once the third conveyor section 29 has been lowered to the horizontal position, valves 124 and 128 are closed. Any fluid trapped in the cylinders 56 and 66 will act to cushion any vibrations of the conveyor sections in travel.

I claim:

1. A hydraulically foldable discharge conveyor for a bulk material processing plant having a supporting chassis, said conveyor comprising an A-frame, said A-frame being mounted on a supporting chassis, a first conveyor section rigidly secured to said A-frame, said first conveyor section extending angularly rearwardly and upwardly from the chassis, an intermediate conveyor section pivotally connected to the first conveyor section, a third conveyor section pivotally connected to said second conveyor section, said second and third conveyor sections extending angularly rearwardly and upwardly from said first conveyor section, a first pair of hydraulic assemblies connected between said A-frame and said second section for pivotally moving said second section upwardly to a substantially vertical position with respect to said first section, a conveyor belt supported on said first, second and third conveyor sections, a second pair of hydraulic assemblies connected between said second conveyor section and said third conveyor section for pivotally moving said third conveyor section downwardly to a substantially horizontal position with respect to said second conveyor section, and a hydraulic circuit connected to said first and second hydraulic assemblies for selectively moving said second and third conveyor sections between operative and folded positions.

2. A conveyor according to claim 1 including means connected to said third conveyor section and to said second pair of hydraulic assemblies for cushioning vibratory movements of said third conveyor section.

3. A conveyor according to claim 2 wherein said cushioning means comprises a frame having diagonally arranged cross-braces connected to the third conveyor section, said second pair of hydraulic assemblies being connected to the corners of said frame adjacent to said second conveyor.

4. The conveyor according to claim 1 including a cable connected to said A-frame and to said third conveyor section for supporting the conveyor in the operative position.

5. A discharge conveyor for a portable crushing plant having a supporting chassis, said conveyor comprising a fixed conveyor section having an upper end and a lower end, said lower end of said first conveyor section being rigidly secured to the supporting chassis, an intermediate conveyor section having an upper end and a lower end, said lower end being pivotally connected to the upper end of said fixed conveyor section and extending angularly rearwardly and upwardly from said fixed conveyor section, first hydraulic means connected between said fixed conveyor section and said intermediate section for pivoting the intermediate section upwardly to a substantially vertical position from said operating position, an upper conveyor section pivotally connected to the upper end of said intermediate conveyor section and extending angularly rearwardly and upwardly from said fixed conveyor section, second hydraulic means connected to said intermediate conveyor section and said upper conveyor section for pivoting said upper conveyor section downwardly about the upper end of said intermediate conveyor section to a substantially horizontal position, a conveyor belt supported on said fixed, intermediate and upper conveyor sections, means connected to the upper conveyor section for supporting the upper conveyor section in the operating position, and means connected between the second hydraulic assembly and the upper conveyor section for cushioning vibratory motion of said upper conveyor section.

6. A conveyor according to claim 5 including a hydraulic circuit means for selectively actuating said first and second hydraulic means.

7. The conveyor according to claim 5 wherein said cushioning means comprises a diagonally cross braced frame having its four corners connected to the upper conveyor sections, said second hydraulic assembly being connected to the two corners of said frame closest to said intermediate conveyor section.

* * * * *